United States Patent
Millen et al.

(10) Patent No.: US 7,062,654 B2
(45) Date of Patent: Jun. 13, 2006

(54) CROSS-DOMAIN ACCESS CONTROL

(75) Inventors: Jonathan Millen, Palo Alto, CA (US); Grit Denker, Palo Alto, CA (US); Yutaka Miyake, Saitama (JP)

(73) Assignees: SRI International, Menlo Park, CA (US); KDD R&D Laboratories, Inc., Saitama (JP)

( * ) Notice: Subject to any disclaimer, the term of this patent is extended or adjusted under 35 U.S.C. 154(b) by 839 days.

(21) Appl. No.: 10/148,940

(22) PCT Filed: Nov. 9, 2001

(86) PCT No.: PCT/US01/46931

§ 371 (c)(1),
(2), (4) Date: Aug. 15, 2002

(87) PCT Pub. No.: WO02/39281

PCT Pub. Date: May 16, 2002

(65) Prior Publication Data

US 2003/0093666 A1 May 15, 2003

Related U.S. Application Data

(60) Provisional application No. 60/246,936, filed on Nov. 10, 2000.

(51) Int. Cl.
*H04L 9/00* (2006.01)

(52) U.S. Cl. .................. 713/182; 713/156; 713/168; 713/175; 713/200; 713/201

(58) Field of Classification Search ............... 713/182, 713/156, 168, 175, 200, 201
See application file for complete search history.

(56) References Cited

U.S. PATENT DOCUMENTS

| | | | |
|---|---|---|---|
| 5,903,651 A | 5/1999 | Kocher | 380/25 |
| 6,105,131 A | 8/2000 | Carroll | 713/155 |
| 6,275,941 B1 | 8/2001 | Salto et al. | 713/201 |
| 6,301,658 B1 | 10/2001 | Koehler | 713/155 |

OTHER PUBLICATIONS

PR Newswire, "Valicert Launches First Universal Digital Certificate Validation Service and Secure Data Center", Dec. 8, 1999, p. 7648.

*Primary Examiner*—Thomas R. Peeso
(74) *Attorney, Agent, or Firm*—Kin-Wah Tong, Esq.; Patterson & Sheridan, LLP

(57) ABSTRACT

The present invention provides systems and methods of cross-domain access control in which a client node (250) sends a request (250) for a resource to a resource server (260). In response, a local proxy server (270) automatically obtains a ticket having a revocation status (275) and forwards the ticket (275) to an authorization server (280) that communicates with the resource server (260) regarding access.

20 Claims, 3 Drawing Sheets

CROSS-DOMAIN ACCESS CONTROL

This application claims the benefit of U.S. utility patent application No. 60/246936 filed on Nov. 10, 2000 incorporated herein by reference in its entirety.

FIELD OF THE INVENTION

The field of the invention is network access control.

BACKGROUND OF THE INVENTION

Cryptography is used to enhance the security of electronic communications between computers. One cryptographic technique involves use of asymmetric keys to encrypt, decrypt, and identify senders. Such a technique typically employs a public key to encrypt a communication or verify a digital signature and a secret or private key for signing and decrypting communications. While the use of asymmetric keys provides some degree of security against unauthorized viewing and use of the communication, there are problems associated with authentication of the parties.

A trusted certificate authority (CA) may solve authentication problems as to the identity of the sender by issuing a digital certificate. A digital certificate typically contains the certificate holder's name and public key, the CA's name and digital signature, a validity period and a serial number. If the digital signature is valid and if the CA is trustworthy, the recipient can generally trust that the sender identified in the certificate holds the private key corresponding to the public key in the certificate. To send a relatively secure message, a sender encrypts the message using the user's public key and transmits the message to the user. The message can be decrypted only by the user's private key. Thus, the identity of the sender by a trusted CA is critical to the security of the communication.

A further authentication process involves the sending party digitally signing a communication by encrypting the communication with the sending party's private key. The communication can only be decrypted by using the sending party's public key. Thus, the recipient of the communication can trust that the communication came from the sending party.

Within large organizations, an authentication hierarchy may be desirable that corresponds with the levels of the organization. Each level of the organization could have its own private key, and therefore any employee at that particular level would have the same access. While an authentication hierarchy may create some scalability in that maintenance of private keys is relatively less intensive, problems with authentication persist, particularly with respect to latency and resource utilization involved in checking revocation lists.

Revocation lists exist partly to accommodate for certificates that have been compromised and are no longer valid. Prior to allowing access or accepting a communication from a certificate holder, an authorization entity typically checks a revocation list to ensure the certificate has not been revoked. To circumvent at least some of the problems associated with checking revocation lists, U.S. Pat. No. 6,301,658 to Koehler (October 2001) teaches a verification server that assigns a timestamp to a certificate indicating when the certificate was last authenticated. The verification server incrementally updates the levels of authority. Revocation lists having information on revoked certificates, are only accessed when the timestamp indicates the certificate is out of date. The need to access revocation lists, however, still exists as do problems associated with accessing the revocation lists.

U.S. Pat. No. 5,903,651 to Kocher (May 1999) teaches that dependency on revocation lists may be reduced to some degree by a method that reduces the scope of the search needed to determine whether a certificate has been revoked. Even here, problems related to network latency persist since the revocation list still needs to be accessed.

Kerberos is a network authentication protocol developed by M.I.T. (see http://web.mit.edu/kerberos/www/) that teaches a method for unitary login, wherein a single authentication server identifies a user once for access to an application servers. Kerberos uses symmetric keys only, after the first identification step that may use either a password or a user certificate. However, Kerberos is deficient in that it does not allow a standard web browser to be used by the client for access to the application server, or convey the user certificate to the application server for encryption or access control purposes. Also, Kerberos requires more cross-domain communication (which Kerberos calls "inter-realm") when the client and server are not in a common domain.

Thus, there is a need for methods and devices that can substantially circumvent revocation lists while maintaining the integrity of digital certificates and using a web browser to obtain a resource.

SUMMARY OF THE INVENTION

The present invention provides systems and methods of cross-domain access control in which a client node sends a request for a resource to a resource server. In response, a local proxy server automatically obtains a ticket having a revocation status and forwards the ticket to an authorization server that communicates with the resource server regarding access.

In a further aspect, a privilege granting authority may include privilege related information in the ticket. Such privilege information may be used by an authorization server to determine whether the client node is within the class of users that have access to the particular resource.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
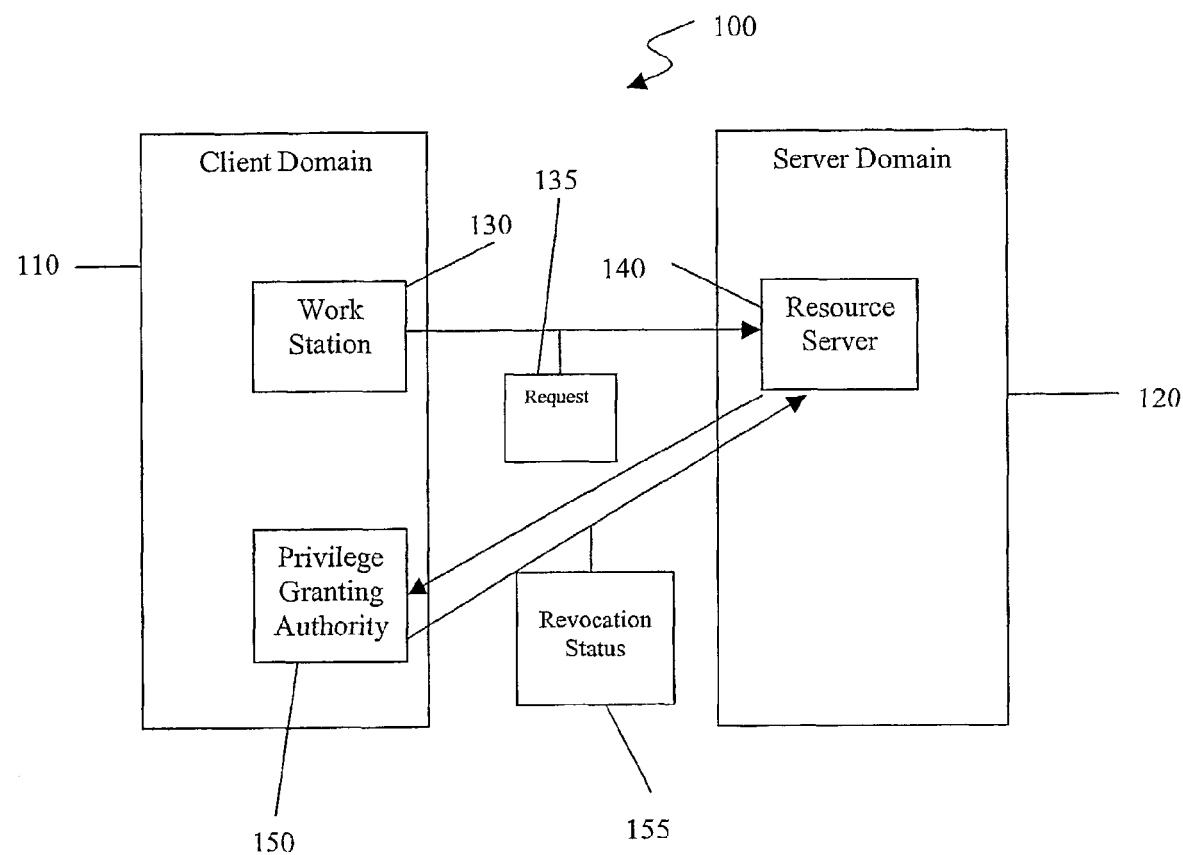
FIG. 1 is a schematic of a prior art system of access control using a revocation list.

Referring first to FIG. 1, a prior art system 100 generally includes a client domain 110 and a server domain 120. The client domain 110 has a work station 130 and a privilege granting authority 150. On the server domain 120 is a resource server 140.

The work station 130 may send a request 135 to a resource server 140. The request is frequently for a web page (e.g. an HTML form), and the request may include a digital certificate (not shown) that the resource server 140 uses to grant access to the resources (not shown).

The resource server 140, in need of a revocation status of the certificate, communicates with the privilege granting authority 150. The privilege granting authority 150 (e.g. ValiCert™), in this case, stores the revocation list (not shown) including identities of certificates that have been revoked. Upon receiving the request for the revocation status, the privilege granting authority 150 must perform the calculations that enable return of a revocation status to the resource server 140.

Because communication traverses a path between different domains (i.e. client domain 110 and server domain 120), network latency and bandwidth problems may create a lag in the work station 130 receiving the resource.

Figure 2:
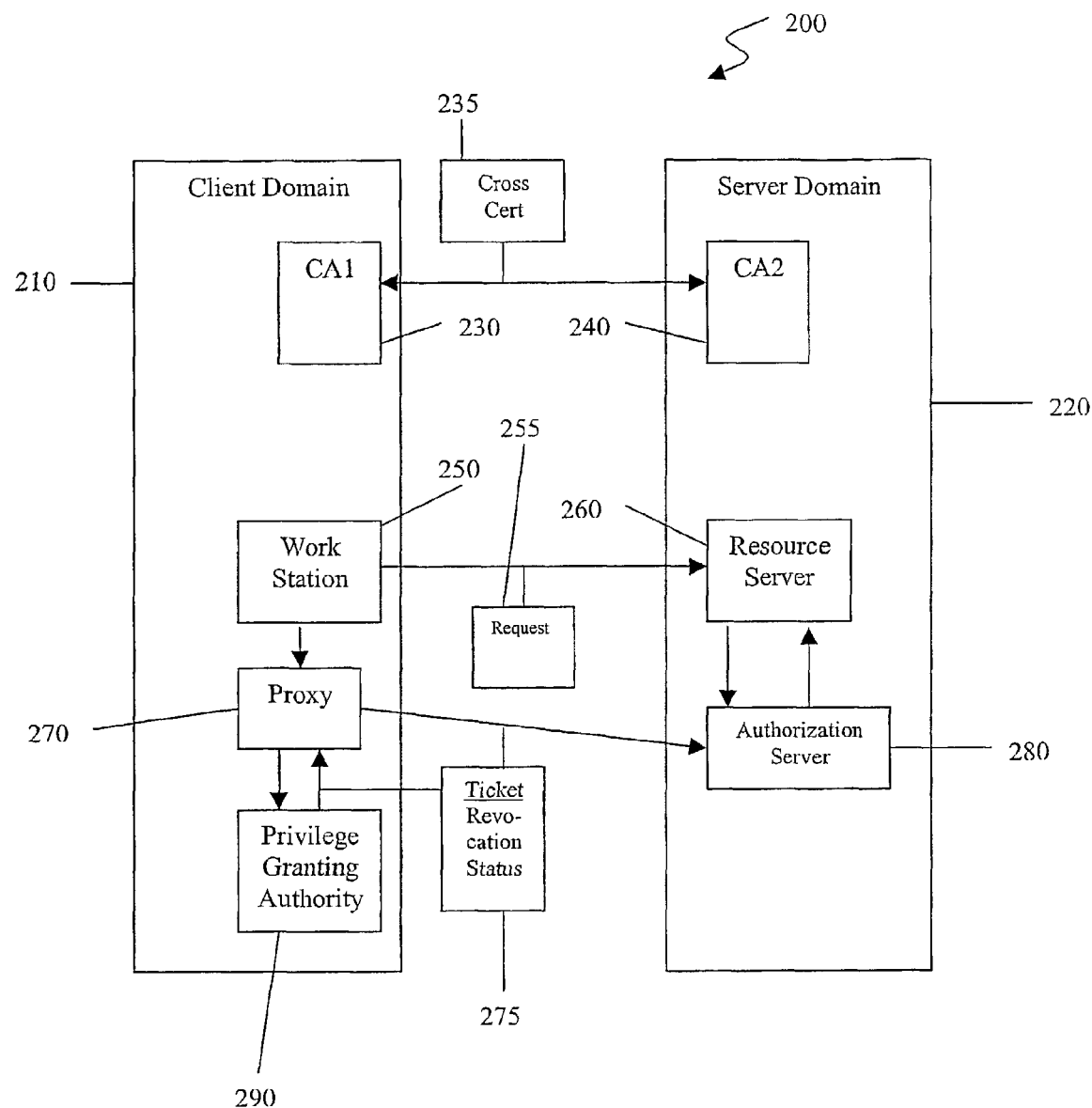
FIG. 2 is a schematic of a system of access control.

FIG. 2, is a system 200 also having a client domain 210 and a server domain 220, however in the embodiment depicted by FIG. 2, access to a revocation list has been obviated.

As defined herein, a "domain" is a group of devices that are administered as a unit with a common certificate authority. Within the Internet, domains are defined by the IP address. As such, "client domain", and "client side" refer to those devices on that are on the domain of the device requesting content. Additionally, "local" as used herein refers to the domain requesting the content.

In order for a server in one domain to identify a client from another domain, the client may present a cross certificate (e.g. in X.509 format) that is anchored by a signature known to the server. This implies that there is likely, but not necessarily, a cross certificate 235 for a certificate authority in the client domain, CA1 230, that is signed by a certificate authority in the server domain, CA2 240, or by a known commercial CA (e.g. Verisign™). Such a cross certificate preferably also contains a public key. In a preferred embodiment, a trusted certificate authority is a mutually non-resident certificate authority meaning that the certificate authority that issues the cross certificate does not reside on both the client domain 210 and the server domain 220, although it may reside on either. In accordance with the definition set forth above, a mutually non-resident certificate authority may reside on a third party domain (not shown) exclusive of both the client domain 210 and the server domain 220.

In a preferred class of embodiments, a cross certificate is established in the client domain 210 to enable secure communications between a work station 250 and a resource server 260. A work station 250 may be any node or combination of nodes that requests information including known desktop computers, PDAs, cellular phones, and such.

A request 255, and subsequent return of the resource, likely utilizes a known web browser such as Internet Explorer and Netscape Navigator. A request 255 preferably includes the communication of a digital certificate or cross certificate to the resource server. While it is contemplated that a request 255 will utilize a web browser and request a web page (i.e. HTML document), it should be appreciated that a request may utilize other manners of transfer and request other resource. For example, using a file transfer protocol (FTP) to obtain program source code or using simple mail transfer protocol (SMTP) to obtain e-mail files and attachments. A request 255 typically originates from a client domain 210 and terminates at a server domain 220.

With respect to authorization, a request 255 may include a simple or structured authorization (not shown). A simple authorization places relatively more computational burden on the user (client domain) while a structured authorization places relatively more computation burden on the server (server domain).

A simple authorization is preferably a digital certificate containing information needed by a resource server 260 including a short validity period and a digital signature of CA1 230. CA1 is trusted by the resource server 260 to ascertain that a certificate has not been revoked.

A structured authorization includes at least one pre-existing public key certificate, and for each certificate, a "hash-chain proof" of non-revocation. A hash-chain proof is a type of digitally signed certificate that can be produced without per-request signature computation. Instead, a signature is computed periodically on a form of a revocation list. A structured privilege generally represents a "group" or "role". A user organization may define a hierarchy of groups and associated roles. A hierarchy is typically known to a privilege granting authority which may encode it either as a table to support simple authorizations or by using subgroup relation certificates to support structured authorizations.

A resource server 260 is preferably a node having the requested resource. It is contemplated that the requested resource may be distributed over more than one resource server, and as such a request 255 may be directed to more than one resource server. A resource server 260 is typically controlled by a party desiring to facilitate secure communications by utilizing public certificates. Contemplated controlling parties include a bank, a product or service vendor, and an auction site.

A proxy 270 is software residing on the client domain 210 that operates to detect a request 255 from a work station 250. Detection may include overhearing, or intercepting a request 255. It is also contemplated that a duplicate request (not shown) may be issued to the proxy 270. Regardless of the manner used to detect a request, a proxy 270 becomes aware that a request including a public certificate has been made. A proxy 270 automatically (e.g. without any manual impetus) issues a ticket request to a privilege granting authority 290, that is, preferably local. Upon receipt of a ticket 275, a proxy server 270 may forward the ticket to an authorization server 280 on the server domain 220.

A privilege granting authority 290 preferably checks a revocation status and returns a ticket 275. Checking a revocation status generally involves accessing a certificate revocation list (CRL) stored on a database and matching a certificate associated with the work station 250 to the set of revoked certificates. If a match occurs, a ticket may not be issued. Alternatively, a ticket may be issued, but such ticket may indicate that the certificate has been revoked. A privilege granting authority 290 may further maintain an access control list (ACL), and in such a case the privilege granting authority 290 checks whether the client has the access it is requesting.

A ticket 275 is preferably a certificate having a short lifetime, but it may contain additional information such as privilege information and such. A short lifetime is contemplated to be up to 24 hours, but is preferred to be less than 2 hours, and more preferred to be 30 minutes or less. A short lifetime represents a period of non-revocation. Thus, a party receiving ticket with a short lifetime can be reasonably sure that the associated certificate has not been revoked.

An authorization server 280 receives the ticket 275 that has at least a short lifetime (period of non-revocation) and may also have access control information (privilege status information). An authorization server 280 receives a ticket 275 that has been forwarded by the proxy 270, and in response to a request for non-revocation status from the resource server 260, the authorization server 280 may provide either the ticket 275 or information indicating a revocation status and access control (e.g. group privileges). The ticket and/or information are used by the resource server 270 to grant or deny access to a resource requested by the work station 250. It should be realized that resource servers no longer need to store access control lists with entries for individual users in order to determine whether a particular request has access to a particular resource. Access control lists may be limited to group or role privilege entries.

Figure 3:
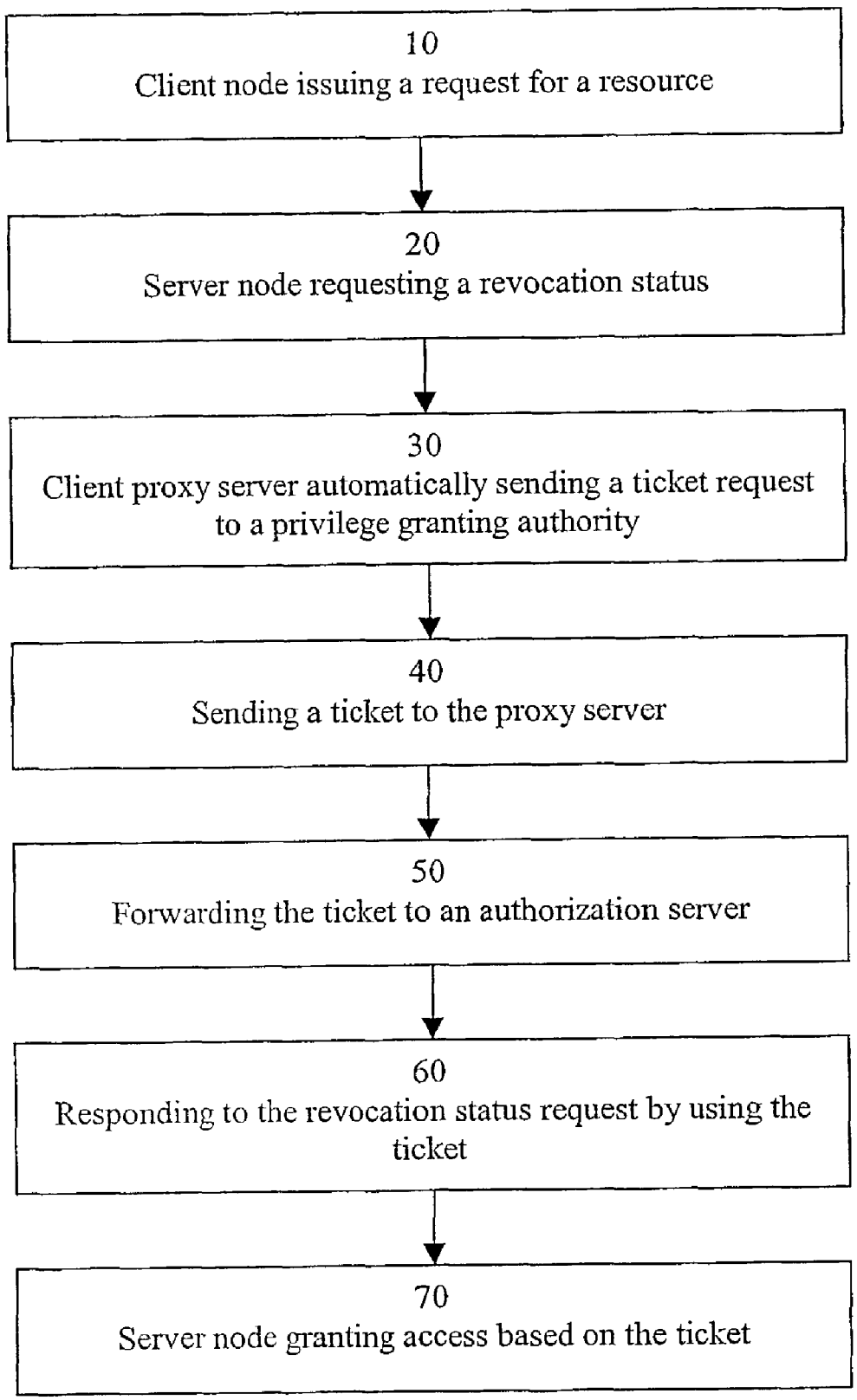
FIG. 3 is a block diagram of a method of access control.

In FIG. 3, a method of cross domain access control includes: 10 a client node requesting a resource from a server side node, the request may further include a digital certificate and privilege information, and preferably utilizes a web browser; 20 a server node requesting a revocation status (preferably the request is made to an authentication server on the same domain as the server node); 30 a client proxy server automatically sending a ticket request to a client side privilege granting authority; 40 sending a ticket to the proxy server (preferably sent by a privilege granting authority); 50 forwarding the ticket to a server side authorization server (preferably forwarded by a privilege granting authority, but may also be sent by a privilege granting authority or some other node on the client domain); 60 responding to the revocation status request by using the ticket (preferably an authorization server responds to the request, and such use of the ticket may include simply forwarding the ticket to the resource server); and 70 server node granting access based on the ticket (may include granting access based on privilege information and non-revocation status).

Thus, specific embodiments and applications of cross domain access control have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A system of cross-domain access control comprising:
   a client domain having a work station, a proxy server, and a privilege granting authority; and
   a server domain having a resource server, and an authorization server, wherein:
      the work station sends a request for a resource to the resource server, the request for the resource including a digital certificate;
      the resource server sends a request for revocation status to the authorization server in response to the request for the resource;
      the proxy server automatically sends a ticket request to the privilege granting authority in response to the request for the resource;
      the privilege granting authority responds to the ticket request by sending a ticket to the proxy server;
      the proxy server forwards the ticket to the authorization server; and
      the authorization server responds to the request for revocation status at least partially by using the ticket.

2. The system of claim 1, further comprising at least one mutually non-resident certificate authority.

3. The system of claim 1, further comprising a web browser used to access the resource server.

4. The system of claim 1, wherein the digital certificate comprises a public key and digital signature.

5. The system of claim 1, wherein the privilege granting authority maintains a database including privilege status information.

6. The system of claim 5, wherein the ticket comprises the privilege status information.

7. The system of claim 6, wherein the authorization server determines access at least in part as a function of the privilege status information.

8. The system of claim 7, wherein the resource server serves the resource based at least in part on the privilege status information.

9. The system of claim 1, further comprising a hierarchy of certificate authorities.

10. A system of cross-domain access control having a client domain and a server domain, comprising:
    a workstation on the client domain that sends a request for a resource to a resource server on the server domain;
    a proxy server programmed to automatically send a ticket request to a privilege granting authority in response to the request for the resource; and
    an authorization server that receives the ticket, and responds to a request for revocation status from the resource server, at least partially by using the ticket.

11. The system of claim 10, further comprising a web browser used to access the resource server.

12. The system of claim 10, wherein the ticket comprises privilege status information.

13. The system of claim 12, wherein the resource server uses the privilege status information to determine privileges.

14. A system of cross-domain access control having a client domain and a server domain, comprising:
    a workstation on the client domain that sends a request for a resource to a resource server on the server domain; and
    a proxy server programmed to automatically send a ticket to the resource server in response to the request for the resource.

15. A method of cross-domain access control comprising:
    a client side node requesting a resource from a server side node, the request including a digital certificate;
    the server side node requesting a revocation status;
    a client side proxy server automatically sending a ticket request to a client side privilege granting authority;
    sending a ticket to the proxy server;
    forwarding the ticket to a server side authorization server; and
    responding to the revocation status request by using the ticket.

16. The method of claim 15, further comprising the server side node granting access based on the ticket.

17. The method of claim 16, wherein the step of granting access is based at least in part on privilege status information.

18. A method of cross-domain access control comprising the ordered steps of:
    issuing a request for a resource;
    overhearing the request for the resource and automatically issuing a ticket request;
    issuing a revocation status request in response to the request for the resource;
    responding to the ticket request by sending a ticket;
    forwarding the ticket in response to the ticket request; and
    using the ticket at least in part to respond to the revocation status request.

19. The method of claim 18, further comprising granting access to the resource based at least in part on the ticket.

20. The method of claim 19, wherein the ticket comprises privilege information, and the step of granting access further comprises analyzing the privilege information.

* * * * *